(12) United States Patent
Huang et al.

(10) Patent No.: US 8,813,156 B1
(45) Date of Patent: Aug. 19, 2014

(54) RESOLUTION RECOMMENDATION FOR DISPLAYING CONTENT ITEMS

(75) Inventors: Jonathan Huang, Santa Clara, CA (US); Jennifer Anne Lees, San Jose, CA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 13/478,055

(22) Filed: May 22, 2012

(51) Int. Cl.
  *H04N 7/173* (2011.01)
  *H04N 7/16* (2011.01)
(52) U.S. Cl.
  USPC ............ 725/116; 725/131; 725/139; 725/151
(58) Field of Classification Search
  USPC .................................. 725/116, 131, 151, 139
  See application file for complete search history.

(56) References Cited

U.S. PATENT DOCUMENTS

| 8,581,803 | B2* | 11/2013 | Milirud et al. | ................. | 345/1.1 |
| 2005/0238247 | A1* | 10/2005 | Kondo et al. | ................. | 382/254 |
| 2005/0244135 | A1* | 11/2005 | Yahata et al. | ................... | 386/52 |
| 2005/0246430 | A1* | 11/2005 | Milirud et al. | ................ | 709/220 |
| 2011/0138064 | A1* | 6/2011 | Rieger et al. | .................. | 709/228 |

\* cited by examiner

*Primary Examiner* — Jason J Chung
*Assistant Examiner* — Sumaiya A Chowdhury
(74) *Attorney, Agent, or Firm* — Fenwick & West LLP (57) ABSTRACT

When a request for a content item is received from a device, the resolution parameters of the device are identified. Based on the resolution parameters of the device, a selection is made as to a version of the content item to recommend from a plurality of versions of the content item. Each version of the content item has a different resolution. A recommendation is provided to the user of the device that the selected version of the content item be displayed on the device.

20 Claims, 6 Drawing Sheets

RESOLUTION RECOMMENDATION FOR DISPLAYING CONTENT ITEMS

BACKGROUND OF THE INVENTION

1. Field of the Invention

This invention pertains in general to content providers, and in particular to recommending a content resolution for displaying digital content items on a device based on the capabilities of the device.

2. Description of the Related Art

The display capabilities of user devices vary drastically. For example, some devices can display high-definition (HD) content (e.g., 720p or 1080p), while other devices can only display standard-definition (SD) content (e.g., 480p). As a result, when a user goes to rent or purchase a video online from a video system, the video system may offer multiple resolution versions of the video. Each resolution version has a different cost associated with it. Typically, the higher the resolution, the higher the cost.

Some consumers do not know the display capabilities of their display device. Therefore, a user may purchase an HD version of a video because HD is popular when in fact the display device does not have HD capabilities. The extra money spent on the HD version will be a waste because the device will not be able to display the HD version.

Thus, there is a need to assist a user in selecting the proper resolution version of content to display on a device.

BRIEF SUMMARY

The embodiments described herein provide methods, computer program products, and systems for recommending a resolution for content. In one embodiment, when a request for a content item is received from a device, the resolution parameters of the device are identified. Based on the resolution parameters of the device, a selection is made as to a version of the content item to recommend from among a plurality of versions of the content item. Each version of the content item has a different resolution. A recommendation is provided to the user of the device that the selected version of the content item be displayed on the device.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 4 is an example of a drop down menu that includes different resolution versions of a movie available according to one embodiment.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview

Described embodiments provide methods, computer program products, and systems for recommending a resolution for a content item to be displayed on a device.

When a request is received for a content item to display on a user device, a determination is made as to what version of the content item should be recommended to the user. Each version of the content item has a different resolution. For example, the versions may be: 480p, 720p, or 1080p. In one embodiment, the determination as to which version to recommend is made by a system separate from the user device. In another embodiment, the determination is made by the user device.

In order to determine what version should be recommended, the resolution parameters of the device are identified. A first set of the identified resolution parameters are evaluated against preliminary criteria. In one embodiment, if the first set of parameters does not satisfy the initial criteria, a default version of the content item is recommended to the user. In one embodiment, the default version is the version with the lowest resolution. For example, if the CPU speed of the device is too slow to display any type of HD content (e.g., 720p or 1080p), the 480p version of the video is recommended.

On the other hand, if the evaluated resolution parameters satisfy the initial criteria, a second set of the identified resolution parameters are included in a scoring function to calculate a score for the device. Based on the calculated score, a determination is made as to what version of the content item to recommend.

Architecture

Figure 1:
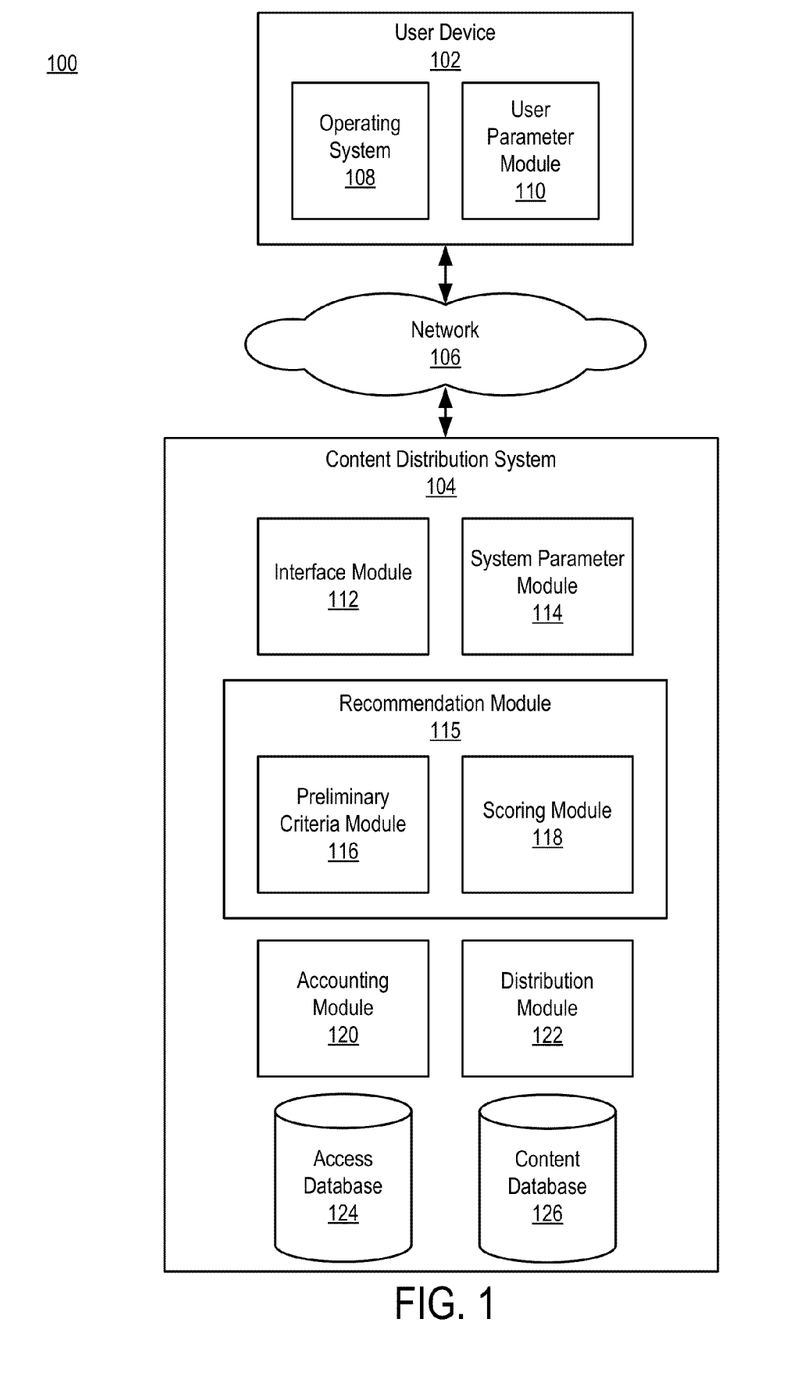
FIG. 1 is a high-level block diagram of a content distribution environment according to one embodiment.

FIG. 1 is a high-level block diagram of a content distribution environment 100 according to one embodiment. The environment 100 includes a user device 102 and a content distribution system 104 connected by a network 106. For ease of understanding the embodiments described herein, FIG. 1 includes a single user device 102. However, the content distribution environment 100 may include many more user devices 102 (e.g., millions of user devices 102).

The network 106 represents the communication pathway between the user device 102 and the content distribution system 104. In one embodiment, the network 106 is the Internet and uses standard communications technologies and/or protocols. The network 106 can also utilize dedicated, custom, or private communications links that are not necessarily part of the Internet. The network 106 may comprise any combination of local area and/or wide area networks, using both wired and wireless communication systems.

The user device 102 includes one or more devices with computing functionality and data communication capabilities. The user device 102 can receive inputs from a user and can transmit and receive data via the network 106. The user device 102 includes a display to present content to a user of the device 102. In one embodiment, the user device 102 is a mobile device, such as a mobile phone, a tablet, and a personal digital assistant (PDA). In another embodiment, the user device 102 is a desktop computer.

The user device 102 includes an operating system 108 and a user parameter module 110. The operating system 108 manages the hardware and software resources of the user device 102. The operating system 108 provides a user interface that allows a user to interact with the device 102. The operating system 108 also controls low-level processes, such as how memory of the device 102 is read and written, the order in which processes are executed, and how information is received and transmitted by the device 102. The operating system 108 may be any type of operating system such as a variant of MICROSOFT WINDOWS, MAC OS X, LINUX, UNIX, ANDROID, and iOS.

The user parameter module 110 determines resolution parameters of the user device 102. A resolution parameter is a parameter of the device 102 that contributes to displaying content provided by the content distribution system 104 on the device 102. Resolution parameters may be, for example, CPU speed, chipset decode speed, chipset capabilities, screen size of the device 102, pixel density, display pixels available, data transfer rate via the network 106 (i.e., connection speed), and storage space available.

In one embodiment, the user parameter module 110 determines the resolution parameters of the device 102 upon receiving a request for the parameters from the content distribution system 104. In another embodiment, the user parameter module 110 periodically determines the resolution parameters.

In one embodiment, the user parameter module 110 determines the resolution parameters of the device 102 by requesting the parameters from the operating system 108. In another embodiment, the user parameter module 110 determines the resolution parameters by testing the device 102 using sample content. In one embodiment, the device 102 receives a sample content item from the content distribution system 104 and as the content item is being processed to be displayed, the user parameter module 110 measures the resolution parameters. For example, when a sample video is received, the parameter module 110 measures the chipset decode speed of the video. The user parameter module 110 transmits the resolution parameters to the content distribution system 104 upon request.

The content distribution system 104 represents a system that distributes content via the network 106. In one embodiment, the content distribution system 104 distributes content to devices of users that have rented or purchased the content from the system 104 or another party associated with the system 104. In one embodiment, the system 104 distributes content to users free of charge.

To simplify and clarify the present description, the content distributed by the content distribution system 104 will be referred to as videos, video files, or video items. However, it should be understood that the system 104 can store and distribute any type of content (i.e., content of any media type and file type). Thus, the operations described herein for determining which resolution version of a video to recommend can be applied to any type of content item, not only videos. Other suitable type of content items may include still images, animations, documents, multimedia presentations, user interfaces, and so forth.

The content distribution system 104 includes an interface module 112, a system parameter module 114, a recommendation module 115, an accounting module 120, a distribution module 122, an access database 124, and a content database 126. The content database 126 stores videos offered and distributed by the system 104 via the network 106. In one embodiment, at least some of the videos stored in the database 124 are videos provided by users of the system 104. In one embodiment, at least some of the stored videos are movies. For each video, the content database 126 includes multiple versions of the video. In one embodiment, each version has a different display resolution. In one embodiment, the content database 126 stores a high-definition (HD) version and a standard-definition (SD) version of each video. In one embodiment, the content database 126 stores a version for one or more of the following resolutions: 240p, 240i, 360p, 360i, 480p, 480i, 576p, 576i, 720p, 1080p, and 1080i.

The interface module 112 communicates with users of the device 102. In one embodiment, the interface module 112 provides an interface to the device 102 to allow a user to browse through the videos available in the content database 126. In one embodiment, through the interface the user can provide a query to search for a video. When the interface module 112 receives a query from the device 102, the interface module 112 searches the content database 126 for videos that match the query. The interface module 112 provides to the device 102 for display a list of the videos that best match the query.

The system parameter module 114 obtains resolution parameters of the user device 102. In one embodiment, when a request for a video is received from the user device 102, the system parameter module 114 requests from the user device 102 the resolution parameters of the device 102. The request for the video may include one or more of the following: a request for the video to be transmitted to the user device 102 (i.e., a request to access the video), a request to view detailed information about the video (e.g., summary of the video, cast, genre, length, etc.), a request to view an interface in which the video is included, and a request to rent or purchase the video.

In one embodiment, the resolution parameters are requested periodically by the system parameter module 114 from the user device 102 (e.g., every 24 hours). In one embodiment, the resolution parameters are requested when a user of the device 102 logs into the system 104, when the user first communicates with the system 104 during a session, and/or the first time the user device 102 communicates with the system 104. When resolution parameters are received from the user device 102, the system parameter module 114 stores the parameters.

The recommendation module 115 recommends to a user of the device 102 which version of a video should be displayed on the device 102. The recommendation module 115 includes a preliminary criteria module 116 and a scoring module 118. The preliminary criteria module 116 evaluates resolution parameters of the device 102 against preliminary criteria. In one embodiment, when a request for a video is received, the preliminary criteria module 116 retrieves certain resolution parameters obtained by the system parameter module 114. The resolution parameters retrieved by the preliminary criteria module 116 may be referred to as gating parameters.

Each gating parameter may provide conclusive evidence as to which version of a video to recommend. Therefore, based on the gating parameters it may be possible to determine which version to recommend without having to evaluate any other resolution parameters. However, if a determination cannot be made, the scoring module 118 evaluates other resolution parameters to make a determination, as is described below. In one embodiment, the gating parameters include one or more of the following: the CPU speed, the chipset decode speed, and chipset capabilities.

The preliminary criteria module 116 evaluates each gating parameter against preliminary criteria of the parameter. In one embodiment, if one of the gating parameters does not satisfy its respective preliminary criteria, the preliminary criteria module 116 transmits a recommendation to the user device 102 of which version should be displayed on the device 102. In one embodiment, the recommendation is the lowest resolution version of the video because it is clear based on the gating parameters that the device 102 would not be able to adequately display any higher resolution version. However, if each of the gating parameters satisfies its respective criteria, the preliminary criteria module 116 requests from the scoring module 118 that it determine which version to recommend because an accurate determination cannot be made based on the gating parameters.

As an example, assume that a request is received for a video and that the content database 126 stores a 1080p HD version, a 780p HD version, and a SD version of the video. The preliminary criteria module 116 retrieves the CPU speed and chipset speed of the device 102. The module 116 evaluates the CPU speed against a CPU threshold and the chipset speed against a chipset threshold. If either the CPU speed or the chipset speed is below its respective threshold, the preliminary criteria module 116 recommends the SD version. However, if both parameters are above their respective thresholds, a request is made to the scoring module 118 that it determine which HD version to recommend.

The scoring module 118 evaluates resolution parameters in a scoring function to determine which version of a video to recommend. In one embodiment, when the scoring module 118 receives a request from the preliminary criteria module 116 that it determine which version of a video to recommend, the scoring module 118 retrieves certain resolution parameters obtained by the system parameter module 114. The resolution parameters retrieved by the scoring module 118 may be referred to as scoring parameters. In one embodiment, the scoring parameters include the resolution parameters retrieved by the system parameter module 114 expect for the gating parameters. The scoring parameters may, for example, include one or more of the following parameters of the device 102: screen size of the device 102, pixel density, display pixels available, data transfer rate via the network 106 (i.e., connection speed), and storage space available on the device 102.

The scoring module 118 uses the scoring parameters to determine a score for the user device 102. The scoring module 118 determines the score by using a scoring function that includes each of the scoring parameters. In one embodiment, in the scoring function, the scoring parameters are summed to determine the score. In one embodiment, one or more of the scoring parameters are mathematically manipulated prior to being summed. A parameter may be mathematically manipulated by, for example, adding, subtracting, multiplying, and/or dividing the parameter by a number. Other values or parameters, such as video parameters (e.g., price of HD and SD) may additionally be included in the function. Below is an example of a scoring function that can be used to determine a score for the user device 102.

> Score of User Device=(abs(screen size in inches−3))+ (screen pixel height−700)+(pixel density in pixels per inch)+((connection speed−HD bit rate)* 100)+(storage space)+(price difference between HD and SD*−1)+(complexity value provided by system administrator)

In this example, parameters, such as the screen size and screen pixel height are manipulated prior to being summed. The screen size is manipulated by taking the absolute value of the screen size minus three and the screen pixel height is manipulated by subtracting seven hundred from the height.

The scoring module 118 determines which version of the video to recommend based on the score determined for the device 102. In one embodiment, the scoring module 118 determines which version to recommend by comparing the score to one or more thresholds or ranges. For example, it may be that if the score is greater than or equal to 25, the HD version is recommended. On the other hand, if the score is less than 25 the SD version is recommended. The table below shows another example in which the scoring module 118 determines which version to recommend based on the range that the score falls within.

| Score Range | Recommended Version |
| --- | --- |
| Less than 5 | 240 p |
| 6-15 | 360 p |
| 16-25 | 480 p |
| 26-35 | 720 p |
| Greater than 35 | 1080 p |

The scoring module 118 transmits the determined recommendation to the user device 102. The user device 102 displays the recommended version as being available at the system 104 for rent or purchase. In one embodiment, an indicator is also displayed to indicate that the version of the video is recommended. The indicator may be, for example, a symbol, highlighting the recommended version or including text with the recommended version (e.g., "This version is recommended based on the display capabilities of your device."). In one embodiment, the user device 102 additionally displays the other versions of the video as being available. However, only the recommended version includes the recommendation indicator. In another embodiment, the user device 102 only displays the recommended version as being available even though the content database 126 includes other versions of the video.

Figure 4:
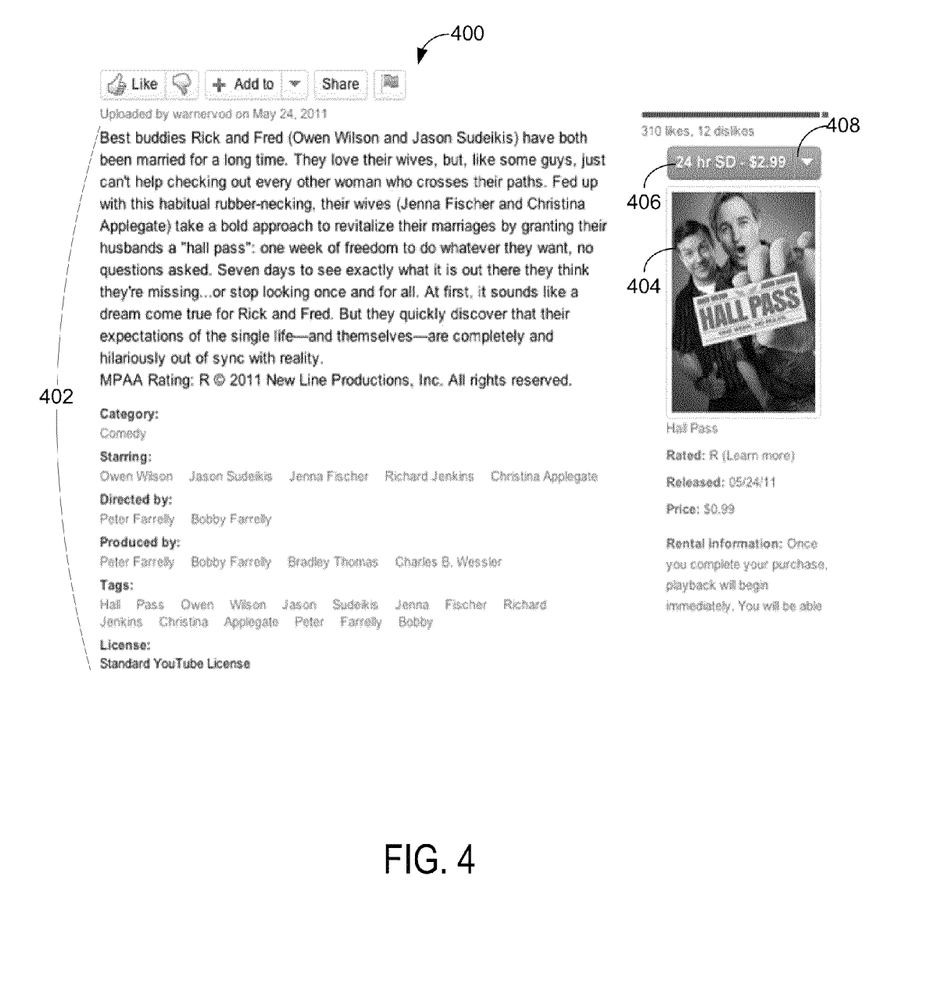
FIG. 4 is an example of a standard-definition version of a movie being recommended for rental according to one embodiment.

FIG. 4 is an example of an interface 400 where an SD version of a movie is being recommended to a user for rental. The interface 400 includes a summary 402 and a representative image 404 of the movie. Through button 406 a recommendation is provided as to which version of the movie the user should rent. In this example, the button 406 is recommending that the user rent the SD version of the movie for a 24 hour period for $2.99.

Figure 5:
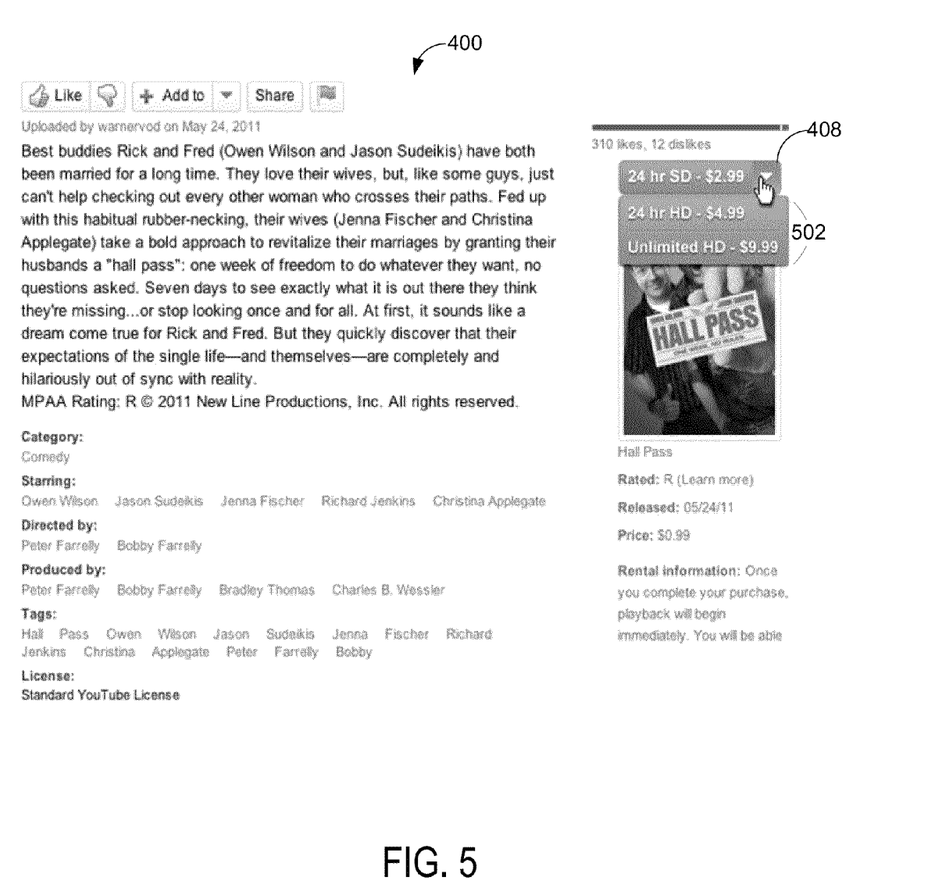
FIG. 5 is an example of a high-definition version of a movie being recommended for rental according to one embodiment.

Even though at least one other version of the video exists, only the recommended version is being displayed so that it is clear to the user which version is being recommended. However, the user can view the other version available using a drop down menu arrow 408. FIG. 5 illustrates the other version of the movie in a drop down menu 502. The other version is an HD version that is offered for a 24 hour period or unlimited access. Therefore, the user has the option of ignoring the recommendation and obtaining the HD version.

Figure 6:
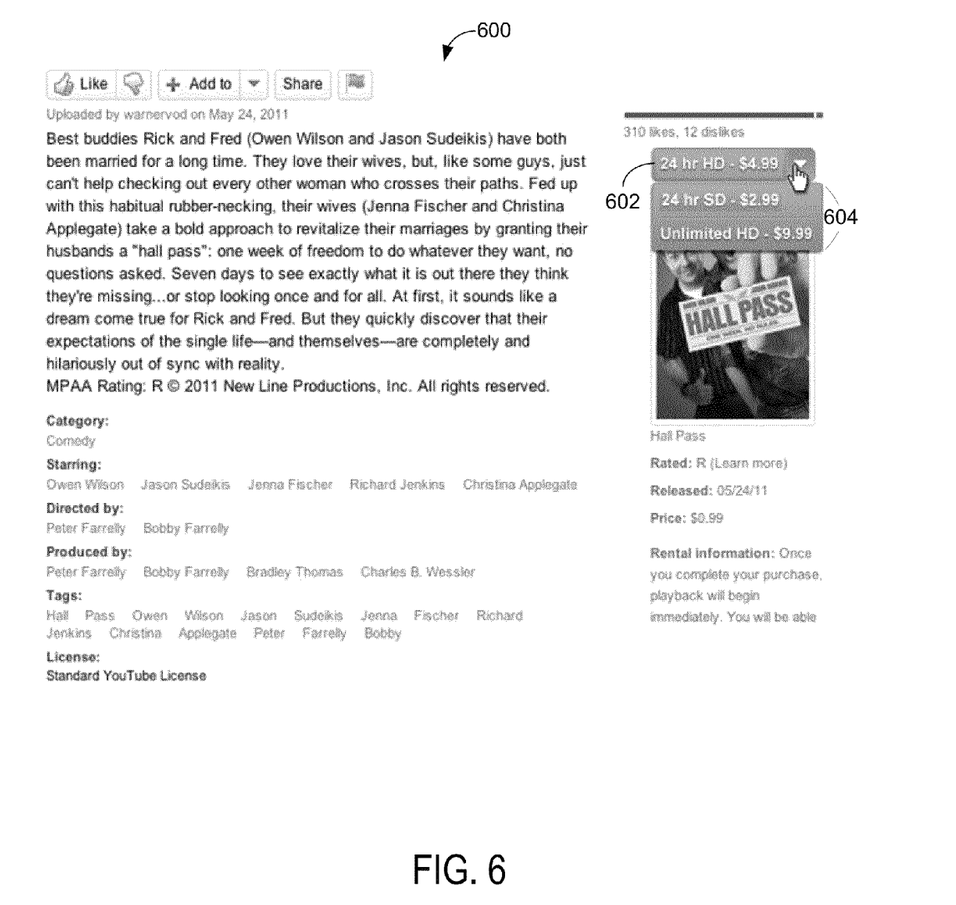
FIG. 6 is another example of a high-definition version of a movie being recommended according to one embodiment.

FIG. 6 is another example of an interface 600 where a HD version of a movie is being recommended. In this interface, button 602 is included and the button is recommending to the user the HD version of the movie. Dropdown menu 604 shows that an SD version of the movie is also available.

The accounting module 120 processes transactions for videos. In one embodiment, when the accounting module 120 receives a request from the user device 102 to rent or purchase a video (i.e., purchase access to the video), the accounting module 120 calculates a total for the video transaction (i.e., the transaction of renting or purchasing the video). In one embodiment, the total is determined based on which version the user of the device 102 has selected to rent or purchase. Other factors that may be taken into account by the accounting module 120 in determining the total for the transaction are taxes, whether the video is being purchase or rented, and the number of times the user will be able to access the video. In one embodiment, the user selects the number of times access to the video will be allowed, such as a onetime access, unlimited access in a 24 hour period, and unlimited access for an indefinite period of time. In another embodiment, the system 104 selects the number of times access to the video will be available.

The accounting module 120 transmits the calculated total to the device 102 for presentation to the user. The accounting module 120 interacts with the user through the device 102 to obtain payment information for the transaction. Payment information may include, for example, one or more of the following: a credit card number, expiration date, gift care number, billing address, name of the user, and bank account information.

In one embodiment, the accounting module 120 stores payment information of users that have registered with the content distribution system 104. Users that have registered with the system 104 are assigned a login name and password. To retrieve payment information of a registered user for a video transaction, the accounting module 120 has the user login to the system 104 using the assigned login name and password. Once the login name and password are verified, the accounting module 120 retrieves the stored payment information of the user.

Once payment information has been obtained for a video transaction, the accounting module 120 generates a receipt for the transaction and transmits the receipt to the user device 102. The accounting module 120 stores information of the video transaction in the access database 124. In one embodiment, the information stored includes information on the user of the transaction, whether the video was rented or purchased, the version of the video involved in the transaction, and the number of times the user is able to access the video.

The distribution module 122 distributes videos stored in the content database 126. When a request is received from a user to access a video rented or purchased, the distribution module 122 checks the access database 124 to determines whether providing the video to the user would surpass the number of times the user is allowed to access the video. If the user is no longer allowed to access the video, the distribution module 122 transmits a message to the user device 102 indicating that the user is not allowed to access the video. On the other hand, if the user is allowed to access the video, the distribution module 122 retrieves from the content database 126 the version of the video rented or purchased by the user and transmits the version to the user device 102. The distribution module 122 updates the access database 124 to show that access to the video was provided.

Figure 2:
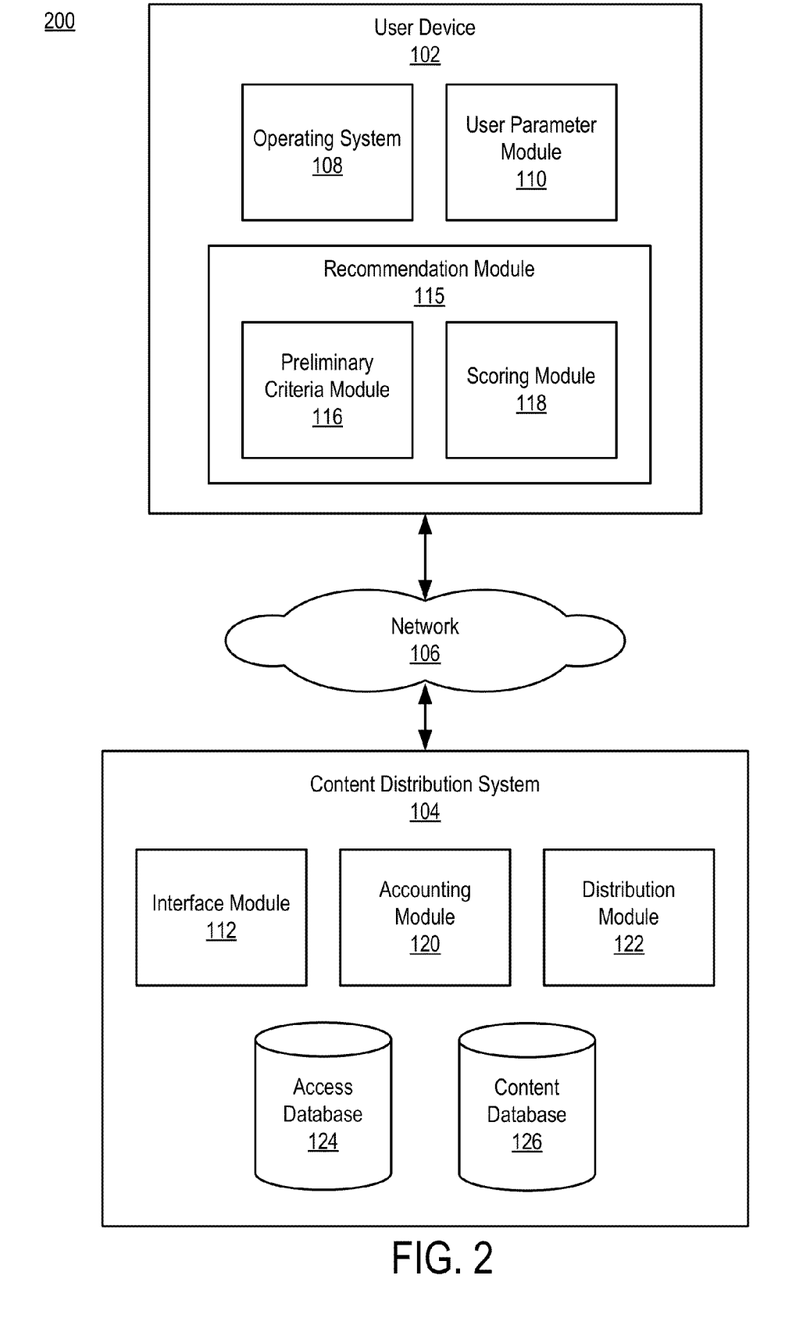
FIG. 2 is a high-level block diagram of a content distribution environment according to a different embodiment.

In the environment 100 of FIG. 1, the determination as to which version of a video to recommend is made at the content distribution system 104. However, in other embodiments, the determination is made at the user device 102. FIG. 2 illustrates a content distribution environment 200 where the determination is made at the user device 102. The configuration of the user device 102 and the content distribution system 104 is similar to that of FIG. 1. However, in this environment 200, the recommendation module 115 is included at the user device 102. In one embodiment, the recommendation module 115 determines at the user device 102 which version of a video to recommend to a user based on resolution parameters obtained by the user parameter module 110.

In another embodiment, the recommendation module 115 evaluates the resolution parameters at the device 102 and the system 104 determines which version to recommend based on the evaluation. Therefore, in this embodiment, the recommendation module 115 evaluates at the device 102 the gating parameters against preliminary criteria and if necessary determines a score for the device 102. The recommendation module 115 provides to the system 104 information on the evaluation of the gating parameters and the score if applicable. Based on the information received, the system 104 determines which version of a video to recommend.

Process

Figure 3:
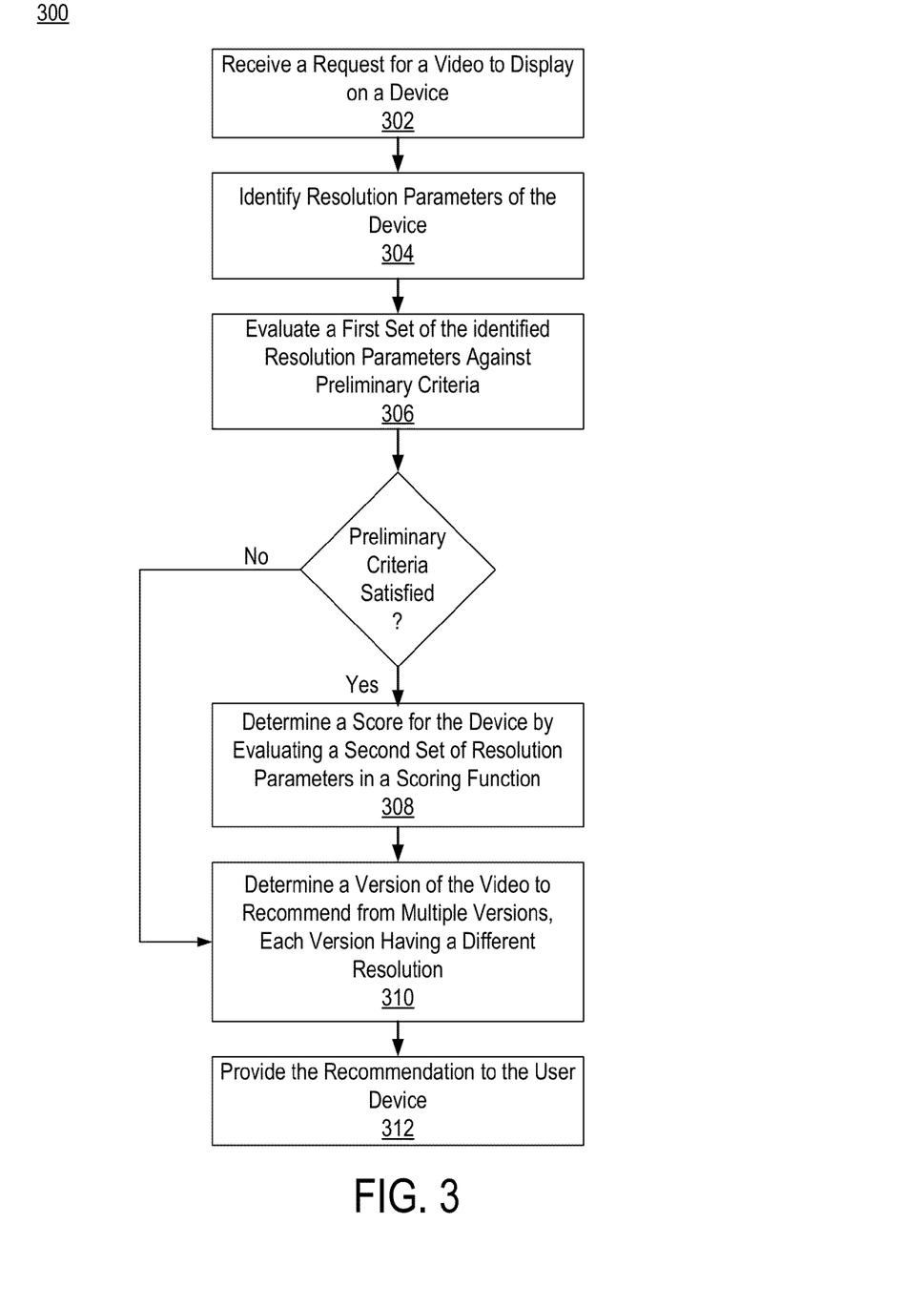
FIG. 3 is a flow chart illustrating a process of recommending a resolution for a video according to one embodiment.

FIG. 3 is a flow chart illustrating a process 300 of recommending a resolution for a video according to one embodiment. In this embodiment, the steps of FIG. 3 are performed by the content distribution system 104. However, in other embodiments the steps may be performed by the user device 102. Those of skill in the art will recognize that other embodiments can perform the steps of FIG. 3 in different orders. Moreover, other embodiments can include different and/or additional steps than the ones described herein.

The content distribution system 104 receives 302 a request for a video to display on the device 102. The system 104 identifies 304 the resolution parameters of the device 102. The system 104 evaluates 306 a first set of the identified resolution parameters against preliminary criteria.

If the evaluated resolution parameters do no satisfy the preliminary criteria, the system 104 is able to determine 310 which version of the video to recommend from the multiple versions stored in the content database 126. In one embodiment, the system 104 recommends the lowest resolution version.

On the other hand, if the evaluated resolution parameters satisfy the preliminary criteria, the system 104 determines 308 a score for the device 102 by evaluating a second set of the identified resolution parameters in a scoring function. The system 104 determines 310 a version of the video to recommend based on the score. The system 104 provides 312 the recommendation to the user device 102 for display to the user. In other embodiments, instead of recommending a version of a video, the system 104 simply selects which version to provide to the user device 102 without allowing the user to provide input.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

The invention claimed is:

1. A computer-implemented method for recommending a display resolution of a video, the method comprising:
   identifying resolution parameters of a device;
   evaluating a first set of the identified resolution parameters against preliminary criteria;
   responsive to the first set of the identified resolution parameters satisfying the preliminary criteria, mathematically manipulating, by a computer system, one or more parameters from a second set of the identified resolution parameters;
   determining a score for the device by combining the second set of the identified resolution parameters; and
   determining, based on the score, a version of a video to recommend for the device from a plurality of versions of the video, each version having a different resolution.

2. The method of claim 1, wherein the device determines one or more of the resolution parameters by processing a sample video and measuring the one or more resolution parameters as the sample video is processed.

3. The method of claim 1, further comprising:
   responsive to a parameter from the first set not satisfying preliminary criteria associated with the parameter, automatically determining a version of the video to recommend from the plurality of versions.

4. The method of claim 3, wherein the automatically determined version is a standard-definition version of the video.

5. The method of claim 1, wherein combining the second set comprises:
   summing the second set of the identified resolution parameters.

6. The method of claim 1, wherein video parameters associated with the video are combined with the second set of the identified resolution parameters to determine the score.

7. The method of claim 1, wherein determining the version of the video to recommend comprises:
   identifying a range that the score is within; and
   determining to recommend the version of the video associated with the range.

8. The method of claim 1, further comprising:
   allowing a user of the device to purchase access to the recommended version of the video.

9. A computer program product having a non-transitory computer-readable storage medium having computer-executable instructions for recommending a display resolution of a video, the computer program product comprising:
   a parameter module configured to identify resolution parameters of a device;
   a preliminary module configured to evaluate a first set of the identified resolution parameters against preliminary criteria; and
   a scoring module configured to:
      mathematically manipulate one or more parameters from a second set of the identified resolution parameters, responsive to the first set of the identified resolution parameters satisfying the preliminary criteria;
      determine a score for the device by combining the second set of the identified resolution parameters; and
      determine, based on the score, a version of a video to recommend for the device from a plurality of versions of the video, each version having a different resolution.

10. The computer program product of claim 9, wherein the device determines one or more of the resolution parameters by processing a sample video and measuring the one or more resolution parameters as the sample video is processed.

11. The computer program product of claim 9, wherein the preliminary module is further configured to:
   automatically determine a version of the video to recommend from the plurality of versions, responsive to a parameter from the first set not satisfying preliminary criteria associated with the parameter.

12. The computer program product of claim 11, wherein the automatically determined version is a standard-definition version of the video.

13. The computer program product of claim 9, wherein the scoring module is further configured to:
   sum the second set of the identified resolution parameters to determine the score.

14. The computer program product of claim 13, wherein video parameters associated with the video are combined with the second set of the identified resolution parameters to determine the score.

15. The computer program product of claim 9, wherein the scoring module is further configured to:
   identify a range that the score is within; and
   determine to recommend the version of the video associated the range.

16. The computer program produce of claim 9, further comprising:
   an accounting module configured to allow a user of the device to purchase access to the recommended version of the video.

17. A computer system for recommending a display resolution of a video, the system comprising:
   one or more computer processors; and
   one or more non-transitory computer-readable storage mediums storing computer program modules adapted to execute on the one or more computer processors, the computer program module comprising:
   a parameter module configured to identify resolution parameters of a device;
   a preliminary module configured to evaluate a first set of the identified resolution parameters against preliminary criteria; and
   a scoring module configured to:
      mathematically manipulate one or more parameters from a second set of the identified resolution parameters, responsive to the first set of the identified resolution parameters satisfying the preliminary criteria;
      determine a score for the device by combining the second set of the identified resolution parameters; and
      determine, based on the score, a version of a video to recommend for the device from a plurality of versions of the video, each version having a different resolution.

18. The system of claim 17, wherein the device determines one or more of the resolution parameters by processing a sample video and measuring the one or more resolution parameters as the sample video is processed.

19. The system of claim 17, wherein the scoring module is further configured to:
   sum the second set of the identified resolution parameters to determine the score.

20. The system of claim 17, wherein video parameters associated with the video are combined with the second set of the identified resolution parameters to determine the score.

* * * * *